United States Patent
Yoshizawa et al.

(10) Patent No.: US 6,472,803 B1
(45) Date of Patent: Oct. 29, 2002

(54) ELECTRON EMISSION LIGHT-EMITTING DEVICE AND DISPLAY APPARATUS USING THE SAME

(75) Inventors: Atsushi Yoshizawa, Tsurugashima (JP); Hideo Satoh, Tsurugashima (JP); Takashi Yamada, Tsurugashima (JP); Takashi Chuman, Tsurugashima (JP); Nobuyasu Negishi, Tsurugashima (JP); Shingo Iwasaki, Tsurugashima (JP); Takuya Hata, Tsurugashima (JP); Takamasa Yoshikawa, Tsurugashima (JP); Hiroshi Ito, Tsurugashima (JP); Kiyohide Ogasawara, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/369,460

(22) Filed: Aug. 6, 1999

(30) Foreign Application Priority Data

Aug. 10, 1998 (JP) ............................................. 10-225836

(51) Int. Cl.[7] .............................. H01J 1/02; H01J 19/24
(52) U.S. Cl. ...................... 313/310; 313/495; 313/503; 313/506; 315/169.1; 315/169.3
(58) Field of Search ................................. 313/498–506, 313/509–512, 306, 309, 310, 495, 496; 428/690, 917; 315/169.1, 169.3

(56) References Cited

U.S. PATENT DOCUMENTS

| | | | | |
|---|---|---|---|---|
| 5,894,189 A | * | 4/1999 | Ogasawara et al. | 313/310 |
| 6,184,612 B1 | * | 2/2001 | Negishi et al. | 313/310 |
| 6,218,777 B1 | * | 4/2001 | Jones et al. | 313/495 |
| 6,259,198 B1 | * | 7/2001 | Yanagisawa et al. | 313/495 |
| 6,285,123 B1 | * | 9/2001 | Yamada et al. | 313/495 |

FOREIGN PATENT DOCUMENTS

JP 09073869 * 3/1997 ............ H01J/31/12

* cited by examiner

Primary Examiner—Nimeshkumar D. Patel
Assistant Examiner—Sikha Roy
(74) Attorney, Agent, or Firm—Sughrue Mion, PLLC

(57) ABSTRACT

An electron emission light-emitting device comprises an electron emission device and a fluorescent material layer formed on the thin-film metal. The electron emission device comprises an electron-supply layer made of semiconductor formed on an ohmic electrode; an insulator layer formed on the electron-supply layer; and a thin-film metal electrode formed on the insulator layer. The electron emission light-emitting device emits light when an electric field is applied between the electron-supply layer and the thin-film metal.

12 Claims, 3 Drawing Sheets

ELECTRON EMISSION LIGHT-EMITTING DEVICE AND DISPLAY APPARATUS USING THE SAME

BACKGROUND OF THE INVENTION

1. Field of the Invention

The present invention relates generally to an electron emission device, and more particularly to an electron emission display device which has a plurality of electron emission devices arranged in an image display array, for example, in a matrix form.

2. Description of the Related Art

Conventionally, in field electron emission display apparatuses, a Field Emission Display (FED) is known as a planar emission display device equipped with an array of cold cathode electron emission sources which does not require cathode heating. The emission principle of, for example, an FED using Spindt-type cold cathodes of minute protrusions is as follows: Its emission principle is like a Cathode Ray Tube (CRT), although this FED has a cathode array of Spindt-type protrusions which is different from that of CRT. In the FED, electrons are drawn into a vacuum space by means of each gate electrode spaced apart from the Spindt-type cathode, and the electrons are made to impinge upon the fluorescent substance that is coated on a transparent anode, thereby causing light emission.

This FED, however, has a problem of low production yield because the manufacture of the minute Spindt-type emitter arrays as a cold cathode is complex and involves many processes.

There is also known an electron emission device with electron emission devices of metal-insulator-metal (MIM) structure as a planar electron emission source. The electron emission device with the MIM structure comprises an Al underlayer as a base electrode, an $Al_2O_3$ insulator layer with about 10 nm thickness, and an Au overlayer, as a top electrode with about 10 nm thickness which are formed in order on the substrate. In the case that this MIM device is placed under an opposing electrode in a vacuum, when a voltage is applied between the Al underlayer and the Au overlayer and, at the same time, an acceleration voltage is applied to the opposing electrode, then some of electrons emit out of the Au overlayer and reach the opposing electrode. In this device, electrons are also made to impinge upon the fluorescent substance coated on the opposing electrode, thereby causing light emission.

These light emitting devices of FED type require a vacuum space in which emitted electrons travel while accelerated towards fluorescent materials and an electric circuit for accelerating the emitted electrons, resulting in an enlarged structure as a whole for a display apparatus.

OBJECT AND SUMMARY OF THE INVENTION

The present invention has been made in view of the above circumstances, and thus an object thereof is to provide an electron emission light emitting device having a simple structure capable of stably emitting light and electrons at a low voltage applied thereto, and moreover a display apparatus including a flat panel display device which employs a plurality of such electron emission light-emitting devices.

The present invention provides an electron emission light-emitting device which comprises:

an electron emission device including an electron-supply layer made of semiconductor formed on an ohmic electrode, an insulator layer formed on the electron-supply layer, and a thin-film metal electrode formed on the insulator layer, whereby the electron emission device emits electrons when an electric field is applied between the electron-supply layer and the thin-film metal; and a fluorescent material layer formed on said thin-film metal.

According to the electron emission light-emitting device having the structure mentioned above, said insulator layer is made of dielectric and has a film thickness of 50 nm or greater.

The present invention further provides an electron emission display device which comprises:

a back substrate; and a plurality of electron emission light-emitting devices formed on said back substrate each comprising;

an electron emission device including an electron-supply layer made of semiconductor formed on an ohmic electrode, an insulator layer formed on the electron-supply layer, and a thin-film metal electrode formed on the insulator layer, whereby the electron emission device emits electrons when an electric field is applied between the electron-supply layer and the thin-film metal; and a fluorescent material layer formed on said thin-film metal.

In the electron emission display device according to the invention, said insulator layer is made of dielectric and has a film thickness of 50 nm or greater.

The electron emission display device according to the invention further comprises an optically transparent front substrate opposing to said back substrate and sandwiching said electron emission light-emitting devices and the fluorescent material layer.

The electron emission display device according to the invention further comprises a collector electrode formed on an inner surface of said front substrate.

In the electron emission display device according to the invention, the display device further comprises a plurality of bus electrodes, each of which is arranged in a stripe form to electrically connect adjacent ones of said thin-film metal electrodes, wherein said ohmic electrodes and said electrodes are stripe-like electrodes and arranged to extend perpendicular to each other.

In the electron emission display device according to the invention, the display device further comprises plural insulative support members formed on said back substrate and disposed between adjacent ones of said electron emission devices so as to enclose the electron emission devices for partitioning them, wherein the distance from said back substrate to the surfaces of said insulative support members is substantially equal to the distance from said back substrate to the surface of said thin-film metal electrodes proximate to said vacuum space.

According to the electron emission light-emitting device of the invention with the above structure, since the fluorescent material layer is formed on the thin-film metal electrode of the electron emission device, no extra electric power is required for accelerating electrons, so that the simple driving circuit may be used in the display device. Further since there is no vacuum space between the fluorescent material layer and the thin-film metal electrode, a super thin flat panel display device is obtained by utilizing the electron emission light-emitting device of the invention and such a panel display device has a good view from outside since there is no necessity of extra spacer for a vacuum space.

Moreover, through-bores are not likely to be produced in the insulator layer because of its relatively thick thickness and therefore its production yield is improved. The electron emission light-emitting device of the invention is a planar or spot-like electron emission diode and can be adapted to high speed devices such as a source of a pixel vacuum tube or bulb, an electron emission source of a scanning or transmission electron microscope, a vacuum-micro electronics device and the like. In addition, this electron emission light-emitting device can serve as a minute microwave tube or a diode which emits electromagnetic waves with millimeter or sub-millimeter wavelength, and also can serve as a high speed switching device.

DETAILED DESCRIPTION OF THE PREFERRED EMBODIMENTS

An electron emission light-emitting device according to an embodiment of the present invention will be described in more detail with reference to the accompanying drawings.

Figure 1:
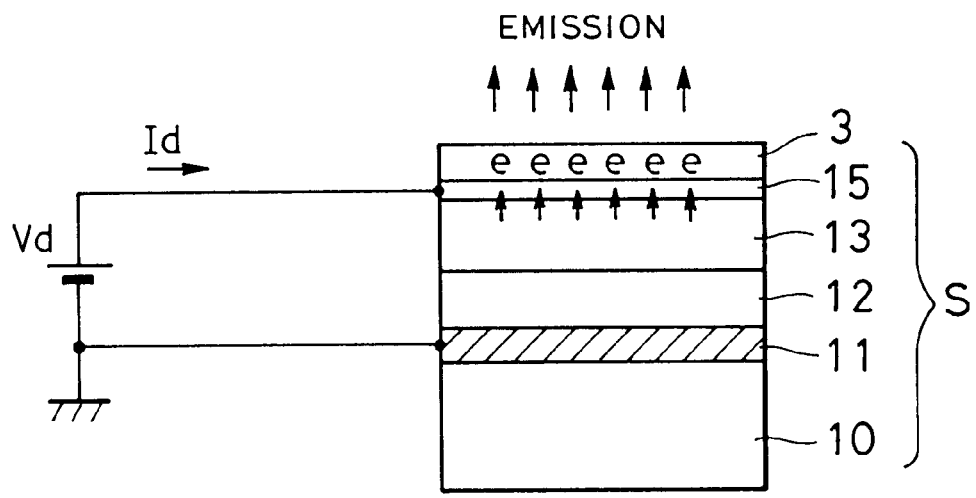
FIG. 1 is a schematic cross-sectional view of an electron emission light-emitting device according to an embodiment of the present invention.

As illustrated in FIG. 1, one electron emission device "S" constructed in a stack configuration comprises; an ohmic electrode 11 made of aluminum (Al), tungsten (W), titanium nitride (TiN), copper (Cu), chromium (Cr) or the like on a substrate 10 made of glass or back substrate; an electron-supply layer 12 made of semiconductor such as silicon (Si) or the like on the ohmic electrode 11; an insulator layer 13 made of dielectric such as $SiO_x$ (X=0.1 to 2.0) or the like on the electron-supply layer 12; and a thin-film metal electrode 15 made of metal such as platinum (Pt), gold (Au) or the like on the insulator layer 13. Particularly, the insulator layer 13 is deposited with a considerably thick thicknesses so as to have a thickness of 50 nm or greater. These layers are formed through the sputtering method by using a gas of Ar, Kr or Xe or a mixture thereof, or a gas mixture essentially consisting of one of those rare gases with $O_2$, $N_2$ or the like mixed therein, under the sputtering conditions of a gas pressure of 0.1 to 100 mTorr, preferably 0.1 to 20 mTorr and the forming rate of 0.1 to 1000 nm/min, preferably 0.5 to 100 nm/min.

An electron emission light-emitting device is constructed in a manner that a fluorescent material layer 3 is formed on the thin-film metal electrode 15 of the electron emission device S. The fluorescent layer 3 directly accepts the electrons from the thin-film metal electrode 15 of the electron emission device S, thereby emitting light.

The preparing method of fluorescent material layer 3 is a spin-coating in that the thin-film metal electrode 15 is coated with a fluorescent material capable of emitting a desired color light in a fluid form. The preparing method of fluorescent material layer 3 is not limited. Further, the material for the back substrate 10 is not limited to glass, and ceramics such as $Al_2O_3$, $Si_3N_4$ and BN etc. may be used instead of glass.

Figure 2:
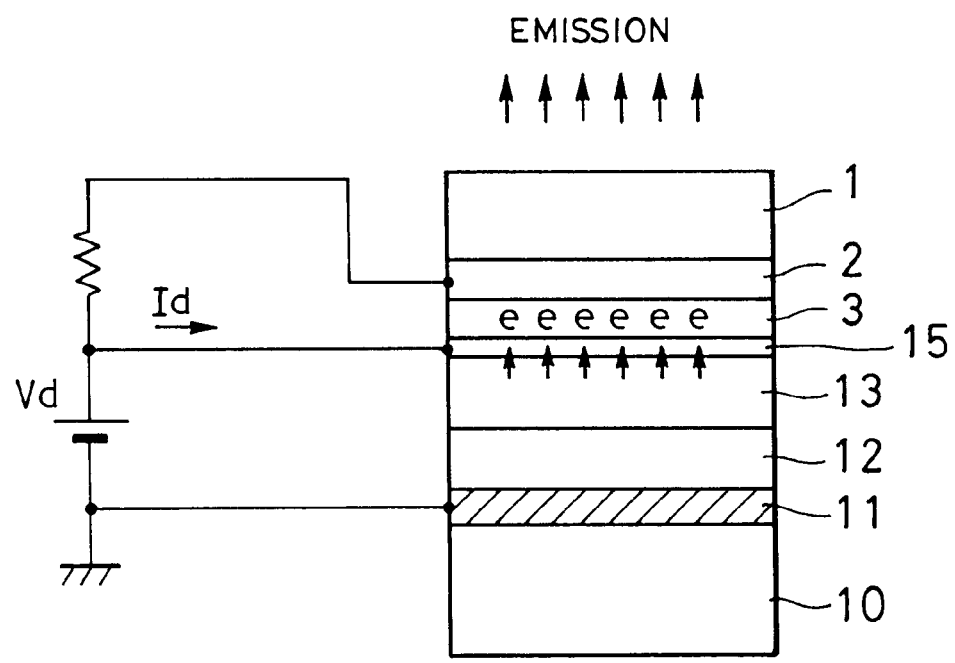
FIG. 2 is a schematic cross-sectional view of an electron emission light-emitting device according to anther embodiment of the present invention.

As shown in FIG. 2, a light-permeable substrate 1 made of glass may be provided as a front substrate with the electron emission light-emitting device to protect electron emission devices formed on the back substrate 10. On the inner surface of the front substrate 1, at lest one transparent collector electrode 2 of, for example, an indium tin oxide (so-called ITO), tin oxide (SnO), zinc oxide (ZnO) or the like, may be formed. The transparent collector electrode traps and collects the electrons passing through the fluorescent material layer. Both the substrates 1 and 10 are supported and sealed to face each other with an adhesive material surrounded by a spacer in a manner that the electron emission light-emitting devices are interposed therebetween.

This electron emission light-emitting device "S" can be regarded as a diode of which the thin-film metal electrode 15 at its surface is connected to a positive applied voltage Vd and the ohmic electrode 11 is connected to a ground potential as shown in FIG. 1. When the voltage Vd is applied between the ohmic electrode 11 and the thin-film metal electrode 15 to supply electrons into the electron-supply layer 12, a diode current Id flows. Since the insulator layer 13 has a high resistance, most of the applied electric field is applied and concentrated to the insulator layer 13. The electrons travel in the insulator layer 13 toward the thin-film metal electrode 15. Some of the electrons that reach near the thin-film metal electrode 15 pass through the thin-film metal electrode 15, due to the strong electric field. As a result the passing electrons are directly introduced into the fluorescent material layer 3 to make a corresponding visible light of the desired color to be emitted. In case that an opposing collector electrode 2 (transparent electrode) is provided, the electrons "e" (emission current Ie) discharged from the thin-film metal electrode 15 and pass through the fluorescent material layer 3 are collected with the collector electrode 2.

An effective material for the electron-supply layer 12 of the electron emission light-emitting device is silicon (Si) and particularly amorphous silicon (so-called a-Si), further particularly the hydrogenated amorphous silicon (a-Si:H) in which almost of the dangling bonds of a-Si are terminated by hydrogen atoms is effective. In addition, hydrogenated amorphous silicon carbide (a-SiC:H) in which parts of Si atoms are replaced by carbon atoms (C) is also effectively used for the electron-supply layer 12. Moreover hydrogenated amorphous silicon nitride (a-SiN:H) in which parts of Si atoms are replaced by nitrogen atoms (N) may be also effectively used for the electron-supply layer 12. In addition, silicon doped with boron, aluminium, gallium, phosphorus, indium, arsenic and/or antimony may be used for the electron-supply layer 12. Instead of Si, an elemental semiconductor or a compound semiconductor of an element of a group IV, a group III-V, a group II-VI or the like, such as a germanium (Ge), germanium silicon compound (Ge—Si), silicon carbide (SiC), gallium arsenide (GaAs), indium phosphide (InP), or cadmium selenide (CdSe) or $CuInTe_2$ can be used for the electron-supply layer 12 of the electron emission light-emitting device as well.

In addition, metals such as Al, Au, Ag and Cu are effective as the electron supplying material, Sc, Ti, V, Cr, Mn, Fe, Co, Ni, Zn, Ga, Y, Zr, Nb, Mo, Tc, Ru, Rh, Pd, Cd, Ln, Sn, Ta, W, Re, Os, Ir, Pt, Tl, Pb, La, Ce, Pr, Nd, Pm, Sm, Eu, Gd, Tb, Dy, Ho, Er, Tm, Yb, Lu and the like can be used for the electron-supply layer 12 as well.

Silicon oxide $SiO_x$ (wherein subscribed x represents an atomic ratio) is effective as the dielectric material of and, metal oxides or metal nitrides such as $LiO_x$, $LiN_x$, $NaO_x$, $KO_x$, $RbO_x$, $CsO_x$, $BeO_x$, $MgO_x$, $MgN_x$, $CaO_x$, $CaN_x$, $SrO_x$, $BaO_x$, $ScO_x$, $YO_x$, $YN_x$, $LaO_x$, $LaN_x$, $CeO_x$, $PrO_x$, $NdO_x$, $SmO_x$, $EuO_x$, $GdO_x$, $TbO_x$, $DyO_x$, $HoO_x$, $ErO_x$, $TmO_x$, $YbO_x$, $LuO_x$, $TiO_x$, $ZrO_x$, $ZrN_x$, $HfO_x$, $HfN_x$, $ThO_x$, $VO_x$, $VN_x$, $NbO_x$, $NbN_x$, $TaO_x$, $TaN_x$, $CrO_x$, $CrN_x$, $MoO_x$, $MoN_x$, $WO_x$, $WN_x$, $MnO_x$, $ReO_x$, $FeO_x$, $FeN_x$, $RuO_x$, $OsO_x$, $CoO_x$, $RhO_x$, $IrO_x$, $NiO_x$, $PdO_x$, $PtO_x$, $CuO_x$, $CuN_x$, $AgO_x$, $AuO_x$, $ZnO_x$, $CdO_x$, $HgO_x$, $BO_x$, $BN_x$, $AlO_x$, $AlN_x$, $GaO_x$, $GaN_x$, $InO_x$, $SiN_x$, $GeO_x$, $SnO_x$, $PbO_x$, $PO_x$, $PN_x$, $AsO_x$, $SbO_x$, $SeO_x$, $TeO_x$ and the like can be used as well for the insulator layer 13.

Furthermore, metal complex oxides such as $LiAlO_2$, $Li_2SiO_3$, $Li_2TiO_3$, $Na_2Al_{22}O_{34}$, $NaFeO_2$, $Na_4SiO_4$, $K_2SiO_3$, $K_2WO_4$, $Rb_2CrO_4$, $Cs_2CrO_4$, $MgAl_2O_4$, $MgFe_2O_4$, $MgTiO_3$, $CaTiO_3$, $CaWO_4$, $CaZrO_3$, $SrFe_{12}O_{19}$, $SrTiO_3$, $SrZrO_3$, $BaAl_2O_4$, $BaFe_{12}O_{19}$, $BaTiO_3$, $Y_3Al_5O_{12}$, $Y_3Fe_5O_{12}$, $LaFeO_3$, $La_3Fe_5O_{12}$, $La_2Ti_2O_7$, $CeSnO_4$, $CeTiO_4$, $Sm_3Fe_5O_{12}$, $EuFeO_3$, $Eu_3Fe_5O_{12}$, $GdFeO_3$, $Gd_3Fe_5O_{12}$, $DyFeO_3$, $Dy_3Fe_5O_{12}$, $HoFeO_3$, $Ho_3Fe_5O_{12}$, $ErFeO_3$, $Er_3Fe_5O_{12}$, $Tm_3Fe_5O_{12}$, $LuFeO_3$, $Lu_3Fe_5O_{12}$, $NiTiO_3$, $Al_2TiO_3$, $FeTiO_3$, $BaZrO_3$, $LiZrO_3$, $MgZrO_3$, $HfTiO_4$, $NH_4VO_3$, $AgVO_3$, $LiVO_3$, $BaNb_2O_6$, $NaNbO_3$, $SrNb_2O_6$, $KTaO_3$, $NaTaO_3$, $SrTa_2O_6$, $CuCr_2O_4$, $Ag_2CrO_4$, $BaCrO_4$, $K_2MoO_4$, $Na_2MoO_4$, $NiMoO_4$, $BaWO_4$, $Na_2WO_4$, $SrWO_4$, $MnCr_2O_4$, $MnFe_2O_4$, $MnTiO_3$, $MnWO_4$, $CoFe_2O_4$, $ZnFe_2O_4$, $FeWO_4$, $CoMoO_4$, $CoTiO_3$, $CoWO_4$, $NiFe_2O_4$, $NiWO_4$, $CuFe_2O_4$, $CuMoO_4$, $CuTiO_3$, $CuWO_4$, $Ag_2MoO_4$, $Ag_2WO_4$, $ZnAl_2O_4$, $ZnMoO_4$, $ZnWO_4$, $CdSnO_3$, $CdTiO_3$, $CdMoO_4$, $CdWO_4$, $NaAlO_2$, $MgAl_2O_4$, $SrAl_2O_4$, $Gd_3Ga_5O_{12}$, $InFeO_3$, $MgIn_2O_4$, $Al_2TiO_5$, $FeTiO_3$, $MgTiO_3$, $NaSiO_3$, $CaSiO_3$, $ZrSiO_4$, $K_2GeO_3$, $Li_2GeO_3$, $Na_2GeO_3$, $Bi_2Sn_3O_9$, $MgSnO_3$, $SrSnO_3$, $PbSiO_3$, $PbMoO_4$, $PbTiO_3$, $SnO_2-Sb_2O_3$, $CuSeO_4$, $Na_2SeO_3$, $ZnSeO_3$, $K_2TeO_3$, $K_2TeO_4$, $Na_2TeO_3$, $Na_2TeO_4$ and the like can be used as well for the insulator layer 13. And still furthermore, sulfides such as FeS, $Al_2S_3$, MgS, ZnS and the like, fluorides such as LiF, $MgF_2$, $SmF_3$ and the like, chlorides such as HgCl, $FeCl_2$, $CrCl_3$ and the like, bromides such as AgBr, CuBr, $MnBr_2$ and the like, iodide such as $PbI_2$, CuI, $FeI_2$ and the like and metal oxidized nitrides such as SiAlON and the like can be used as well for the insulator layer 13.

Moreover, carbon such as diamond, Fullerene ($C_{2n}$) and the like or metal carbide such as $Al_4C_3$, $B_4C$, $CaC_2$, $Cr_3C_2$, $Mo_2C$, MoC, NbC, SiC, TaC, TiC, VC, $W_2C$, WC, ZrC and the like are also effective as the dielectric material of the insulator layer 13. Fullerene ($C_{2n}$) consists of carbon atoms. The representative $C_{60}$ is a spherical surface basket molecule as known a soccer ball molecule. There is also known $C_{32}$ to $C_{960}$ and the like. The subscribed x in $O_x$, $N_x$ and the like in the above chemical formulas represent atomic ratios and also herein after.

The film thickness of the insulator layer 13 may be 50 nm or greater preferably in ranging from 100 to 1000 nm.

Metals Pt, Au, W, Ru and Ir are effective as the material for the thin-film metal electrode 15 on the electron emission side. In addition, Be, C, Al, Si, Sc, Ti, V, Cr, Mn, Fe, Co, Ni, Cu, Zn, Ga, Y, Zr, Nb, Mo, Tc, Rh, Pd, Ag, Cd, In, Sn, Ta, Re, Os, Tl, Pb, La, Ce, Pr, Nd, Pm, Sm, Eu, Gd, Tb, Dy, Ho, Er, Tm, Yb, Lu and the like can be used as well for the thin-film metal electrode.

Although sputtering is particularly effective in the fabrication of those layers and the substrate, vacuum deposition, CVD (Chemical Vapor Deposition), laser ablation, MBE (Molecular Beam Epitaxy) and ion beam sputtering are also effective.

Electron emission devices according to the invention were fabricated as embodiments and their characteristics were examined concretely. Common back substrates were prepared on each of which plural electron emission devices was formed in a matrix form. In each of the devices, an ohmic electrode of 300 nm thick of TiN was deposited on a back substrate of glass by sputtering, and an electron-supply layer of amorphous Si was deposited with approximately 5.0 $\mu$m thick on the electrode, and an insulator layer of $SiO_x$ was deposited with 400 nm thick on the electron-supply layer, and a thin-film metal electrode of Pt was deposited with a thickness of approximately 10 nm on the $SiO_x$ layer. Then, a fluorescent layer of a fluorescent substance corresponding to a green color emission is formed on the thin-film metal electrode of every resultant device. Thus plural electron emission light-emitting devices were provided. In addition, plural comparative electron emission light-emitting devices were also fabricated in the same manner as embodiments mentioned above excepting that there is no fluorescent layer on the thin-film metal electrode and instead transparent substrate having an ITO collector electrode and a fluorescent layer formed in turn on the inner surface thereof was supported apart from the back substrate carrying electron emission light-emitting devices by a 5 mm gap in parallel by a spacer in such a way that the thin-film.

Next, the diode current Id and emission luminance eL of every device were measured, while a driving voltage Vdv ranging from 40 to 110V is applied between the thin-film metal electrode and the ohmic electrode of each device. With respect to the comparative devices, the accelerating voltage Vac was measured about each device. The following table illustrates the resultant measured characteristics of the devices.

TABLE

| | EMBODIMENTS | | COMPARATIVES | | |
|---|---|---|---|---|---|
| Vdv (V) | eL (cd/m$^2$) | Id (mA) | eL (cd/m$^2$) | Id (mA) | Vac (V) |
| 40 | 1 | 20 | 1 | 20 | 285 |
| 50 | 2 | 5 | 2 | 9 | 400 |
| 60 | 4 | 8 | 4 | 6 | 450 |
| 70 | 4 | 6 | 4 | 5 | 435 |
| 80 | 4 | 4 | 4 | 3.5 | 435 |

There was the observation that an aggregation of plural emitting light points appears correspondingly to electron emission light-emitting devices respectively in every embodiment substrate in which the thin-film metal electrode of the device is directly coated with the fluorescent material. In the comparative device in which the vacuum space is provided between the fluorescent material layer and the thin-film metal electrode, there was the observation that a large light colony integrated with emitting light points appears. In any devices, every light emission was flickered in luminance and thus the luminance values in the above table was taken an average. In the embodiments, the peak of luminance was measured at approximately 6 to 7 cd/m$^2$ in a driving voltage Vdv of 80 volt.

As seen form these results, it is understood that the luminance property of electron emission light-emitting devices of embodiments each having the fluorescent material layer with which the thin-film metal electrode is coated is substantially the same as that of the comparative device to which a driving voltage Vdv of 400V to 450V was applied in which the 5 mm vacuum space is provided between the fluorescent material layer and the thin-film metal electrode.

Figure 3:
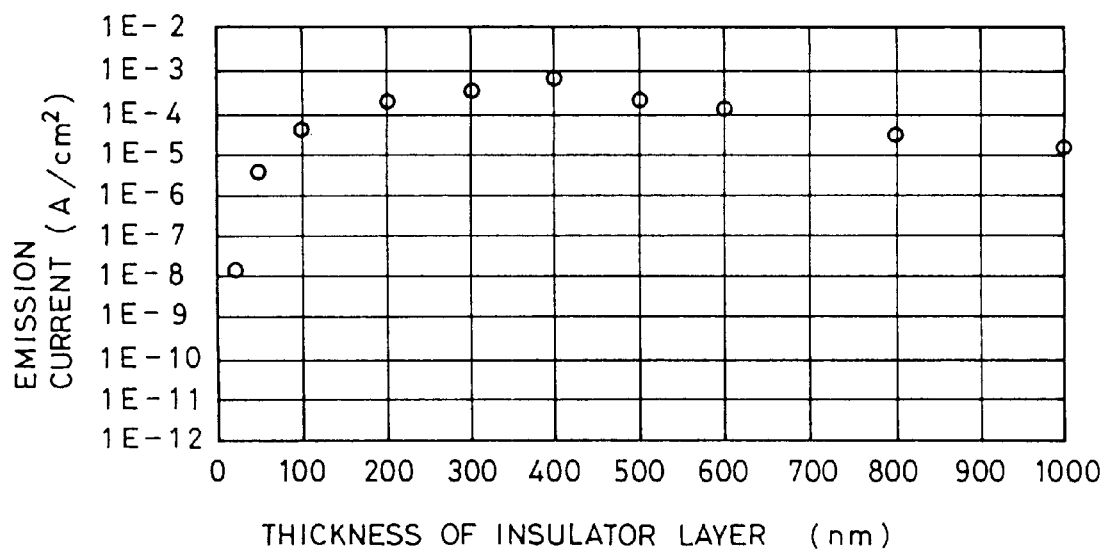
FIG. 3 is a graph showing a relationship between the emission current Ie and the film thickness of the insulator layer in the electron emission light-emitting device according to the invention.
Figure 4:
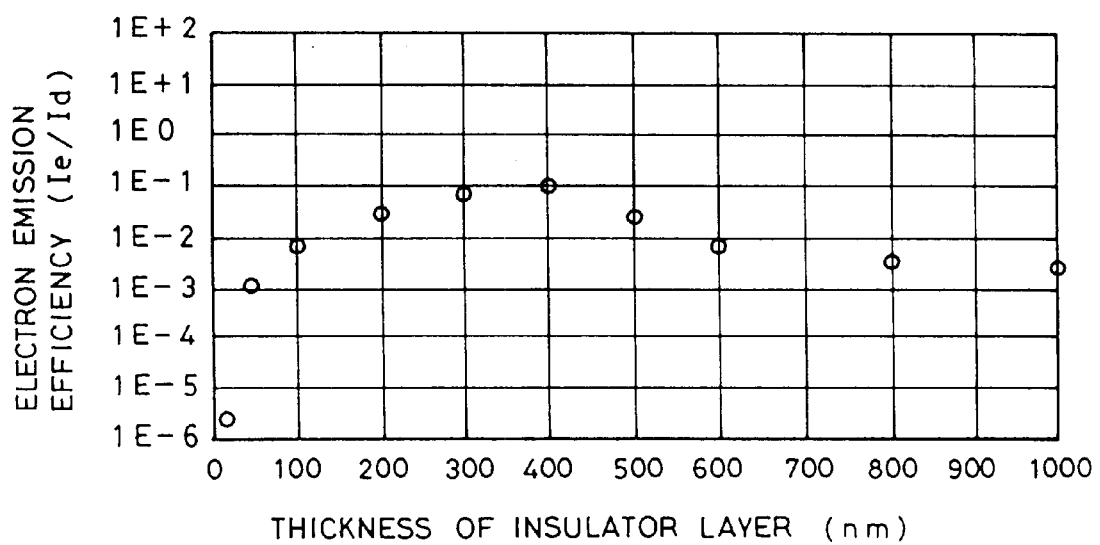
FIG. 4 is a graph showing a relationship between the electron emission efficiency and the film thickness of the insulator layer in the electron emission light-emitting device according to the invention.

Next, the second embodiments of electron emission light-emitting devices were fabricated in the same manner as the first embodiments excepting that an insulator layer 13 of $SiO_x$ was deposited while changing the f film thickness thereof in a range of 25 nm, 50 nm, 100 nm, 200 nm, 300 nm, 400 nm, 500 nm, 600 nm, 800 nm, 1000 nm. Then, the emission current Ie and the electron emission efficiency (Ie/Id) of the devices were measured correspondingly to the thicknesses of insulator layer, when a driving voltage Vd of 110 V was applied to the prepared electron emission light-emitting devices. The results are illustrated in FIGS. 3 and 4. As apparent from FIG. 3, the devices whose insulator layer had a thickness of from 50 nm to 1000 nm shows the emission current of about $1 \times 10^{-6}$ A/cm$^2$ or more. As apparent from FIG. 4, the devices whose insulator layer had a thickness of from 50 nm to 1000 nm shows the electron emission efficiency of about $1 \times 10^{-3}$ or more.

There were observations of the surface of the SiOx insulator layer resulted form the oxidation of the electron supply layer by a scanning electron microscope (SEM) during the above formation process, grain surface each having an about 20 nm diameter appeared. The grain structure of SiOx of the insulator layer seems to cause the peculiar phenomenon that the passing current flows through the insulator layer which has a thickness of 50 nm or greater.

Figure 5:
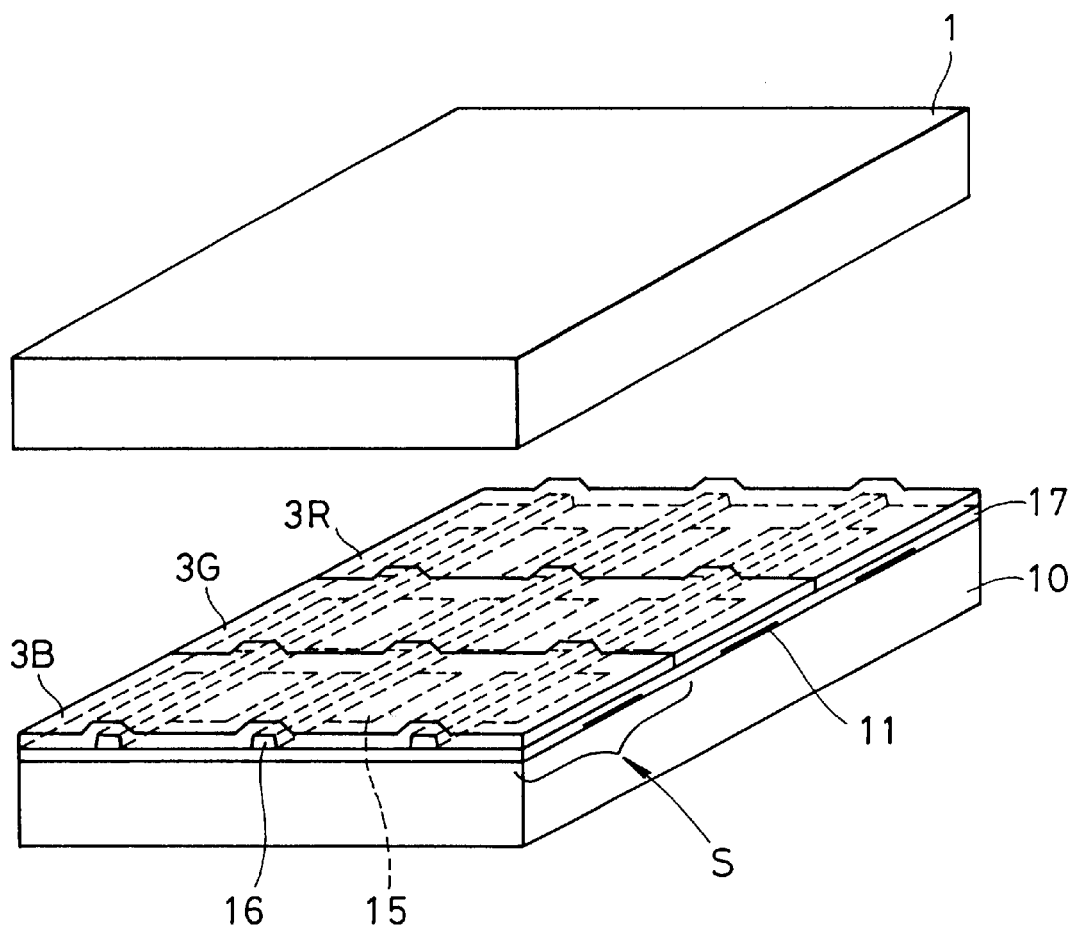
FIG. 5 is a schematic partial perspective view illustrating an electron emission display device according to an embodiment of the present invention, but a front substrate is separated from electron emission light-emitting devices.

FIG. 5 illustrates an embodiment of an electron emission display device.

A plurality of ohmic electrodes 11 extending in parallel with each other are formed on the inner surface of the back substrate 10. The ohmic electrodes 11 are grouped into sets of three corresponding to R (red), G (green), B (blue) color signals to provide a color display panel, and are applied with predetermined signals, respectively. On the ohmic electrodes 11, a plurality of electron emission devices S are formed and arranged in a matrix form. On portions of thin-film metal electrodes of adjacent devices, a plurality of bus electrodes 16 extending perpendicular to the ohmic electrodes and in parallel with each other are routed to electrically connect the thin-film metal electrodes. An intersection of an ohmic electrode 11 and a bus electrode 16 corresponds to an electron emission light-emitting device S. The ohmic electrode 11 of stripe type has dimensions e.g., the width 160 μm, the thickness 0.3 μm and the line interval 300 μm. An electron-supply layer and an insulator layer (not shown) are formed as shown in FIG. 1 in the intersection between the stripe ohmic electrode 11 and the thin-film metal electrode 15 shown in FIG. 5.

An insulative support member 17 is formed to surround each of the electron emission light-emitting devices S and to define a plurality of electron emitting regions. The insulative support member 17 supports the bus electrodes 16, and prevents line failures. More specifically, as illustrated in FIG. 5, the insulative support member 17 or a material having a large electric resistance is previously formed in peripheral portions except for the electron emission light-emitting devices in a thickness similar to a final thickness of the electron emission light-emitting devices when formed in subsequent steps. The insulative support member 17 has a thickness 5 μm for example.

On the thin-film metal electrodes 15, the bus electrodes 16 and the insulative support member 17 in the present embodiment device, fluorescent material layers 3R, 3G, 3B corresponding to R (red), G (green), B (blue) color emissions are separately formed along the ohmic electrodes 11 to which three corresponding to R (red), G (green), B (blue) color signals are provided, respectively. Therefore, a passive matrix scheme or an active matrix scheme may be applied as a driving scheme for the display apparatus of the present invention.

Furthermore, the material for the bus electrodes 16 can be Au, Pt, Al or the like which is generally used for the wiring of an integrated circuit IC, and should have a thickness enough to supply substantially the same potential to the individual devices, adequately of 0.1 to 50 μm. If the electrical resistance of material of the thin-film metal electrode is allowable for the bus electrodes, such material of the thin-film metal electrode may be used for the bus electrodes. Further, while in FIG. 5, the bus electrodes 16 disposed on the thin-film metal electrodes 15 of the back substrate 10 are formed in a simple linear shape, the bus electrodes 16 are preferably formed, instead of the linear shape, so as to have a width between the thin-film metal electrodes 15 of the electron emission light-emitting devices larger than that on the thin-film metal electrodes. In other words, the bus electrodes 16 are preferably formed to be wider between the electron emission light-emitting devices than on the devices. In this way, the resistance of the bus electrodes can be reduced.

The front substrate 1 made of a light-permeable material such as glass may is made to adhere to the fluorescent material layers 3R, 3G, 3B, of the back substrate 10 via a transparent adhesive material. The transparent collector electrode of indium tin oxide (ITO) my be formed on the inner surface (facing the back substrate 10) of the front substrate 1. In addition, the back substrate 10 with electron emission devices and the front substrate 1 may be adhered with the mixture of a given fluorescent material and a thermoplastic resin binder in which the fluorescent material is uniformly dispersed therein so that the mixture serves as a fluorescent material. A black stripe masks BM or back metal layer may be provided between the fluorescent material layers 3R, 3G, 3B. Of course, a monochrome display panel may be formed by replacing all the RGB light emitting elements with monochrome light emitting elements.

In addition, an auxiliary insulator layer comprised of an insulator such as $SiO_2$, $SiN_x$, $Al_2O_3$ or AlN may be provided between the back substrate 10 and the ohmic electrode 11, but not shown in FIG. 5. The auxiliary insulator layer serves to prevent an adverse influence of the back substrate 10 on the device (such as elution of an impurity such as an alkaline component or a roughened substrate surface).

What is claimed is:

1. An electron emission light-emitting device comprising:
   an electron emission device including an electron-supply layer made of semiconductor formed on an ohmic electrode, an insulator layer formed on the electron-supply layer, and a thin-film metal electrode formed on the insulator layer, whereby the electron emission device emits electrons when an electric field is applied between the electron-supply layer and the thin-film metal; and
   a fluorescent material layer formed on said thin-film metal.

2. An electron emission light-emitting device according to claim 1, wherein said insulator layer is made of dielectric and has a film thickness of 50 nm or greater.

3. An electron emission display device comprising:
- a back substrate; and
- a plurality of electron emission light-emitting devices formed on said back substrate each comprising:
  - an electron emission device including an electron-supply layer made of semiconductor formed on an ohmic electrode, an insulator layer formed on the electron-supply layer, and a thin-film metal electrode formed on the insulator layer, whereby the electron emission device emits electrons when an electric field is applied between the electron-supply layer and the thin-film metal; and
  - a fluorescent material layer formed on said thin-film metal.

4. An electron emission display device according to claim 3, wherein said insulator layer is made of dielectric and has a film thickness of 50 nm or greater.

5. An electron emission display device according to claim 3 further comprising an optically transparent front substrate opposing to said back substrate and sandwiching said electron emission light-emitting devices and the fluorescent material layer.

6. An electron emission display device according to claim 5 further comprising a collector electrode formed on an inner surface of said front substrate.

7. An electron emission display device according to claim 3 further comprising a plurality of bus electrodes, each of which is arranged in a stripe form to electrically connect adjacent ones of said thin-film metal electrodes, wherein said ohmic electrodes and said electrodes are stripe-like electrodes and arranged to extend perpendicular to each other.

8. An electron emission display device according to claim 3 further comprising:
- a front substrate opposing said back substrate;
- a vacuum space interposed between said front substrate and said back substrate; and
- plural insulative support members formed on said back substrate and disposed between adjacent ones of said electron emission devices so as to enclose the electron emission devices for partitioning them, wherein the distance from said back substrate to the surfaces of said insulative support members is substantially equal to the distance from said back substrate to the surface of said thin-film metal electrodes proximate to said vacuum space.

9. An electron emission light-emitting device according to claim 1, wherein said fluorescent material layer is directly placed upon said thin-film metal electrode without a vacuum space placed between said fluorescent material layer and said thin-film metal electrode.

10. An electron emission display device according to claim 3, wherein said fluorescent material layer is directly placed upon said thin-film metal electrode without a vacuum space placed between said fluorescent material layer and said thin-film metal electrode.

11. An electron emission light-emitting device according to claim 1, wherein electrons, which are emitted from said thin-film metal electrode of said electron emission device, are accepted by said fluorescent material layer without passing through a vacuum space.

12. An electron emission display device according to claim 3, wherein electrons, which are emitted from said thin-film metal electrode of said electron device, are accepted by said fluorescent material layer without passing through a vacuum space.

* * * * *